(12) United States Patent
An et al.

(10) Patent No.: US 11,821,806 B2
(45) Date of Patent: Nov. 21, 2023

(54) CALCULATION METHOD OF ULTIMATE MOMENT RESISTANCE AND MOMENT-ROTATION CURVE FOR STEEL BEAM TO CONCRETE-FILLED STEEL TUBE COLUMN CONNECTIONS WITH BIDIRECTIONAL BOLTS

(71) Applicant: DALIAN UNIVERSITY OF TECHNOLOGY, Liaoning (CN)

(72) Inventors: Yonghui An, Liaoning (CN); Guojie Zhou, Liaoning (CN); Jinping Ou, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 770 days.

(21) Appl. No.: 16/969,883

(22) PCT Filed: Dec. 14, 2018

(86) PCT No.: PCT/CN2018/121020
§ 371 (c)(1),
(2) Date: Aug. 13, 2020

(87) PCT Pub. No.: WO2020/103234
PCT Pub. Date: May 28, 2020

(65) Prior Publication Data
US 2020/0408626 A1    Dec. 31, 2020

(30) Foreign Application Priority Data
Nov. 23, 2018  (CN) .................. 201811402976.6

(51) Int. Cl.
*G01L 5/24* (2006.01)
*E04B 1/24* (2006.01)
*E04B 1/30* (2006.01)

(52) U.S. Cl.
CPC .............. *G01L 5/24* (2013.01); *E04B 1/2403* (2013.01); *E04B 1/30* (2013.01);
(Continued)

(58) Field of Classification Search
CPC . G01L 5/24; E04B 1/2403; E04B 1/30; E04B 2001/2415; E04B 2001/2418;
(Continued)

(56) References Cited

U.S. PATENT DOCUMENTS

| 6,773,650 B1* | 8/2004 | Longo ............... B28B 15/007 |
| | | 425/111 |
| 2003/0093961 A1* | 5/2003 | Grossman ............ E04C 3/294 |
| | | 52/250 |

FOREIGN PATENT DOCUMENTS

| CN | 102002982 A | 4/2011 |
| CN | 203583672 U | 5/2014 |

(Continued)

OTHER PUBLICATIONS

Huang, Pin et al.; "Calculation of moment-rotation curve of steel-reinforced concrete square col. and steel beam joint with bolted end-plate"; Journal of Central South University, Science and Technology, vol. 44, Issue No. 10, Oct. 26, 2013, pp. 4273-4280.
(Continued)

*Primary Examiner* — Cedric Johnson
(74) *Attorney, Agent, or Firm* — Muncy, Geissler, Olds & Lowe, P.C.

(57) ABSTRACT

The invention discloses a calculation method of ultimate moment resistance and moment-rotation relation for steel beam to concrete-filled steel tube column connections with bidirectional bolts, wherein the calculation method as follows: calculate ultimate moment resistance values of the connection for different failure modes, i.e. yielding of the endplate or T-stub in bending, failure of bolts in tension,
(Continued)

failure of column in transverse compression, failure of panel zone in shear, and yielding of the steel beam in bending; the smallest one in the five ultimate moment resistance values is taken as the ultimate moment resistance of the connection; obtain the initial rotational stiffness of the connection by the test, simulation or theoretical calculation; then, the moment-rotation curve of the connection is obtained by substituting the initial rotational stiffness and the ultimate moment resistance into the proposed exponential model for the moment-rotation relation.

2 Claims, 6 Drawing Sheets

(52) U.S. Cl.
CPC ............... *E04B 2001/2415* (2013.01); *E04B 2001/2418* (2013.01); *E04B 2001/2451* (2013.01); *E04B 2001/2478* (2013.01)

(58) Field of Classification Search
CPC ..... E04B 2001/2451; E04B 2001/2478; E04B 2001/2454; E04B 1/185; G06F 30/00

USPC ............................................................ 703/1
See application file for complete search history.

(56) References Cited

FOREIGN PATENT DOCUMENTS

| CN | 103953123 A | | 7/2014 | |
|---|---|---|---|---|
| CN | 105863080 A | * | 8/2016 | ............. E04B 1/185 |
| CN | 206034647 U | * | 3/2017 | |
| CN | 108518003 A | * | 9/2018 | ............... E04B 1/30 |
| JP | 2011-162978 A | | 8/2011 | |
| WO | WO-2015/045104 A1 | | 4/2015 | |

OTHER PUBLICATIONS

Yang, Songsen et al.; "Research on the Moment Capacity of Fully Assembled Column-Beam Joint Composed of Outer Sleeve and Strengthened Extended End-Plate"; Industrial Construction, vol. 47, Issue No. 12, Dec. 20, 2017, pp. 158-166.

* cited by examiner

CALCULATION METHOD OF ULTIMATE MOMENT RESISTANCE AND MOMENT-ROTATION CURVE FOR STEEL BEAM TO CONCRETE-FILLED STEEL TUBE COLUMN CONNECTIONS WITH BIDIRECTIONAL BOLTS

TECHNICAL FIELD

The present disclosure relates to a calculation method of ultimate moment resistance and moment-rotation curve for steel beam to concrete-filled steel tube column connections with bidirectional bolts, which is suitable for the semi-rigid design of such connections. It belongs to the field of design for steel beam to concrete-filled steel tube column connections with bidirectional bolts.

BACKGROUND

The steel beam to concrete-filled steel tube column connection with bidirectional bolts, is a new type of connection which connects the concrete-filled steel tube column and the steel beam by using bidirectional bolts and the endplate or T-stub. The concrete-filled steel tube column is a kind of component with high compression bearing capacity, good plasticity, and good local stability; the bolted connection is easy to construct and it has good ductility. Therefore, the steel beam to concrete-filled steel tube column connection with bidirectional bolts combines advantages of both the column and the connection. Existing experimental researches indicate that such connections have advantages of high bending capacity, large initial rotational stiffness, good ductility, simple construction, reliable construction quality, etc. The connection has good application prospect in the practical engineering, especially in high-seismic areas.

The design method of the new type of connection is required as the support in the practical engineering. It is generally assumed that the connection is rigid or hinged in its design, however, most connections are semi-rigid; which leads to an unsafe bias in design calculation based on the assumed rigid connection, while it leads to a conservative bias in design calculation based on the assumed hinged connection. Furthermore, clause 5.1.4 of Code for Design of Steel Structures (Chinese design standard GB50017-2017) stipulates that the effect of change in the angle between intersecting members should be considered in the semi-rigid connection of the beam and the column; the moment-rotation curve of the connection must be determined in the internal force analysis, and the behavior of the connection should be in accord with the moment-rotation curve. Therefore, it is necessary to study the initial rotational stiffness, ultimate moment resistance and moment-rotation curve of the connection. At present, many researches has been conducted on semi-rigid bolted connections of the steel structure, and calculation methods of initial rotational stiffness, ultimate moment resistance and moment-rotation curve have been established for the steel structure; in which moment-rotation curve models of the bolted connection include: linear model, multi-linear model, polynomial model, exponential function model, power function model, inverse trigonometric function model, etc. However, these calculation methods and moment-rotation models are originally developed for connections of the steel structure, which cannot be directly applied to steel beam to concrete-filled steel tube column connections with bidirectional bolts. In addition, a lot of test data are required to fit the moment-rotation model for the bolted connection of the steel structure in the past, and the accuracy of the model is required to be further improved. For the steel beam to concrete-filled steel tube column connection with bidirectional bolts, it is time-consuming, laborious and costly to determine the moment-rotation curve by experiments. Therefore, it is necessary to propose a theoretical calculation method for the ultimate moment resistance and a practical moment-rotation curve model for the connection; which can avoid a lot of tests to obtain key parameters in the semi-rigid design, and it greatly saves time and cost.

SUMMARY OF THE INVENTION

The present invention discloses a calculation method of ultimate moment resistance and moment-rotation curve for steel beam to concrete-filled steel tube column connections with bidirectional bolts, and the calculation method is applicable to four common types of such connections: extended unstiffened endplate bidirectional bolted connection, extended stiffened endplate bidirectional bolted connection, flush endplate bidirectional bolted connection, and bidirectional bolted T-stub connection; the calculation includes the following steps:

1) calculate the ultimate moment resistance of the connection for yielding of the endplate or T-stub in bending:

firstly, yield line parameters for four common types of connections are calculated as follows:

for the extended unstiffened endplate bidirectional bolted connection, yield line parameter $L_1$ is obtained by equation (1):

$$L_1 = \frac{b_p}{2}\left[h_2\left(\frac{1}{p_{fi}} + \frac{1}{s}\right) + h_1\left(\frac{1}{p_{fe}}\right) - \frac{1}{2}\right] + \frac{2}{g}[h_2(p_{fi} + s)] \quad (1)$$

where $b_p$ is the width of the endplate; $h_1$ is the distance from centerline of first bolt row to lower surface of compression flange; $h_2$ is the distance from centerline of second bolt row to lower surface of the compression flange; $p_{fi}$ is the distance from centerline of the second bolt row to lower surface of tension flange; $p_{fe}$, is the distance from centerline of the first bolt row to upper surface of tension flange; g is bolt gage; $s=0.5\sqrt{b_p g}$ is the distance from centerline of second bolt row to edge of the yield line pattern;

for the extended stiffened endplate bidirectional bolted connection, if $d_e \leq s$, yield line parameter $L_2$ is obtained by equation (2):

$$L_2 = \frac{b_p}{2}\left[h_2\left(\frac{1}{p_{fi}} + \frac{1}{s}\right) + h_1\left(\frac{1}{p_{fe}} + \frac{1}{2s}\right)\right] + \frac{2}{g}[h_2(p_{fi} + s) + h_1(d_e + P_{fe})] \quad (2)$$

where $d_e$ is the distance from the centerline of the first bolt row to the edge of the endplate;

if $d_e > s$, the yield line parameter $L_2$ is obtained by equation (3):

$$L_2 = \frac{b_p}{2}\left[h_2\left(\frac{1}{p_{fi}} + \frac{1}{s}\right) + h_1\left(\frac{1}{p_{fe}} + \frac{1}{2s}\right)\right] + \frac{2}{g}[h_2(p_{fi} + s) + h_1(s + p_{fe})] \quad (3)$$

for the flush endplate bidirectional bolted connection, if there is only one row of bolts in tensile zone, the yield line parameter $L_3$ is obtained by equation (4):

$$L_3 = \frac{b_p h_1}{2}\left(\frac{1}{p_{fi}} + \frac{1}{s}\right) + \frac{2h_1}{g}(p_{fi} + s) \quad (4)$$

if there are two rows of bolts in the tensile zone, the yield line parameter $L_3$ is obtained by equation (5):

$$L_3 = \frac{b_p}{2}\left[h_1\left(\frac{1}{p_{fi}}\right) + h_2\left(\frac{1}{s}\right)\right] + \frac{2}{g}[h_1(p_{fi} + 0.75p) + h_2(s + 0.25p)] + \frac{g}{2} \quad (5)$$

where p is the distance between the two rows of bolts;
for the bidirectional bolted T-stub connection, yield line parameter $L_4$ is obtained by equation (6):

$$L_4 = \frac{b_p}{2}\left[h_2\left(\frac{1}{p_{fi}}\right) + h_1\left(\frac{1}{p_{fe}}\right)\right] \quad (6)$$

then, substituting the above yield line parameter L into equation (7), the ultimate moment resistance $M_{ep}$ of the connection for yielding of the endplate or T-stub in bending is obtained:

$$M_{ep} = f_y t_{ep}^2 L \quad (7)$$

where $f_y$ is the yield strength of the endplate, $t_{ep}$ is the thickness of the endplate or T-shaped flange, and L is the yield line parameter of the connection, i.e. $L_1$, $L_2$, $L_3$ or $L_4$;

2) calculate the ultimate moment resistance of the connection for failure of bidirectional bolts in tension:
for endplate bidirectional bolted connections, the ultimate moment resistance of the connection for failure of bidirectional bolts in tension is obtained by equation (8):

$$M_{bo} = n_t \cdot \min(0.9 f_{ub} A_s, 0.48\pi d_m t_{ep} f_{up}) \cdot (h_b - t_{bf}) \quad (8)$$

for the bidirectional bolted T-stub connection, the ultimate moment resistance of the connection for failure of bidirectional bolts in tension is obtained by equation (9):

$$M_{bo} = n_t \cdot \min(0.9 f_{ub} A_s, 0.48\pi d_m t_{ep} f_{up}) \cdot (h_b + t_{bf}) \quad (9)$$

where $n_t$ is the number of bolts in tension zone; $f_{ub}$ is the ultimate tensile strength of the bolt, $A_s$ is the effective tensile area of the bolt, $d_m$, is the nominal diameter of the bolt head, $h_b$ is the height of the steel beam, $t_{bf}$ is the thickness of beam flange, and $f_{up}$ is the ultimate tensile strength of the endplate or T-stub flange;

3) calculate the ultimate moment resistance of the connection for failure of the panel zone in shear:
for endplate bidirectional bolted connections, the ultimate moment resistance of the connection for failure of the panel zone in shear is obtained by equation (10):

$$M_{pz} = \left(\frac{1.8 f_{y,cw} A_{vc}}{\sqrt{3}} + 0.85 v A_c f_{cd} \sin\alpha\right) \cdot (h_b - t_{bf}) \quad (10)$$

for the bidirectional bolted T-stub connection, the ultimate moment resistance of the connection for failure of the panel zone in shear is obtained by equation (11):

$$M_{pz} = \left(\frac{1.8 f_{y,cw} A_{vc}}{\sqrt{3}} + 0.85 v A_c f_{cd} \sin\alpha\right) \cdot (h_b + t_{bf}) \quad (11)$$

where $f_{y,cw}$ is the yield strength of the steel tube web of the concrete-filled steel tube column; $A_{vc}$ is the cross-sectional area of the steel tube web in shear; v is the reduction factor to allow for the effect of longitudinal compression of steel tube in the concrete-filled steel tube column on resistance in shear; $A_c$ is the cross-sectional area of the encased concrete; $f_{cd}$ is the design value of the cylindrical compressive strength of the encased concrete of the concrete-filled steel tube column; α is an angle in the panel zone;

the reduction factor to allow for the effect of longitudinal compression of the concrete-filled steel tube column on resistance in shear, i.e. v, is calculated according to equation (12):

$$v = 0.55\left(1 + \frac{2N}{N_u}\right) \quad (12)$$

where N is the design compressive normal force in the concrete-filled steel tube column, and $N_u$ is the ultimate compressive bearing capacity of the concrete-filled steel tube column;

the angle α in the panel zone is calculated according to equation (13):

$$\alpha = \arctan[(w_c - 2t_{cf})/z] \quad (13)$$

where $w_c$ is the width of the concrete-filled steel tube column; $t_{cf}$ is the thickness of the steel tube flange of the concrete-filled steel tube column; z is the length of the lever arm for the connection, and z is $(h_b - t_{bf})$ for endplate bidirectional bolted connections, while z is $(h_b + t_{bf})$ for the bidirectional bolted T-stub connection;

4) calculate the ultimate moment resistance of the connection for failure of column in transverse compression:
for endplate bidirectional bolted connections, the ultimate moment resistance of the connection for failure of column in transverse compression is obtained by equation (14):

$$M_c = [2\omega\rho k_{cw} b_{eff,cw} t_{cw} f_{y,cw} + 0.85 k_c b_{eff,c}(d_c - 2t_{cw}) f_{cd}] \cdot (h_b - t_{bf}) \quad (14)$$

for the bidirectional bolted T-stub connection, the ultimate moment resistance of the connection for failure of column in transverse compression is obtained by equation (15):

$$M_c = [2\omega\rho k_{cw} b_{eff,cw} t_{cw} f_{y,cw} + 0.85 k_c b_{eff,c}(d_c - 2t_{cw}) f_{cd}] \cdot (h_b + t_{bf}) \quad (15)$$

where ω is the reduction factor to allow for the effects of panel zone in shear on the transverse compression resistance of the steel tube web of the concrete-filled steel tube column; ρ is the reduction factor to allow for the steel tube web buckling in the concrete-filled steel tube column; $k_{cw}$ and $k_c$ are two factors to allow for the effect of longitudinal compressive stress on the transverse compression resistance of the steel tube and the encased concrete, respectively; $b_{eff,cw}$ and $b_{eff,c}$ are the effective lengths of steel tube web and encased concrete in compression respectively; $d_c$ is the section depth of the concrete-filled steel tube column; $t_{cw}$, is the thickness of the steel tube web;

the reduction factor to allow for the effects of panel zone in shear on the transverse compression resistance of the steel tube web of the concrete-filled steel tube column, i.e. ω, is obtained by equation (16):

$$\omega = \begin{cases} \dfrac{1}{\sqrt{1+1.3(b_{eff,cw}t_{cw}/A_{vc})^2}} & \text{(for exterior connections)} \\ 1 & \text{(for interior connections)} \end{cases} \quad (16)$$

the reduction factor to allow for the steel tube web buckling in the concrete-filled steel tube column, i.e. ρ, is obtained by equations (17):

$$\rho = \begin{cases} (\lambda - 0.2)/\lambda^2 & (\lambda > 0.72) \\ 1 & (\lambda \le 0.72) \end{cases} \quad (17)$$

$$\lambda = 0.932\sqrt{\dfrac{b_{eff,cw}(w_c - 2t_{cf} - 2t)f_{y,cw}}{Et_{cw}^2}} \quad (18)$$

where λ is the slenderness ratio of the steel tube web in the concrete-filled steel tube column; for the rolled section of the steel tube, t is the inner radius of corners in the steel tube with rolled section; for the welded section of the steel tube, t is the height of the steel tube weld leg; E is elastic modulus of the steel tube;

the factors to allow for the effect of longitudinal compressive stress on the transverse compression resistance of the steel tube and the encased concrete, i.e. $k_{cw}$ and $k_c$, are obtained by equations (19) and (20):

$$k_{cw} = \begin{cases} 1 & (\sigma_{col} \le 0.7f_{y,cw}) \\ 1.7 - \dfrac{\sigma_{col}}{f_{y,cw}} & (\sigma_{col} > 0.7f_{y,cw}) \end{cases} \quad (19)$$

$$k_c = 1.3 + 3.3\dfrac{\sigma_c}{f_{cd}}, \text{ and } k_c = 2 \text{ if it is greater than 2} \quad (20)$$

where $\sigma_{col}$ is the longitudinal compressive stress in the steel tube of the concrete-filled steel tube column, $\sigma_c$ is longitudinal compressive stress in the encased concrete;

the effective lengths of steel tube web and encased concrete in compression, i.e. $b_{eff,cw}$ and $b_{eff,c}$, are obtained by equation (21):

$$b_{eff,cw} = b_{eff,c} = t_{bf} + 2\sqrt{2}h_e + 5(t_{cf}+t) + s_p \quad (21)$$

where $h_e$ is the effective height of the weld seam between the steel beam flange and the endplate; $s_p$ is the length obtained by dispersion through the endplate, and its minimum is the thickness of the endplate, and its maximum is double thickness of the endplate;

5) calculate the ultimate moment resistance of the connection for yielding of the steel beam in bending:
the ultimate moment resistance of the connection for yielding of the steel beam in bending is obtained by equation (22):

$$M_b = f_{yb}W_p \quad (22)$$

where $f_{yb}$ is the yield strength of the steel beam; $W_p$ is the plastic section modulus of the steel beam;

6) calculate the final ultimate moment resistance and failure mode of the connection:

the smallest value of ultimate moment resistances for the above five failure modes is the final ultimate moment resistance of the connection, and the corresponding failure mode is the actual failure mode:

$$M_u = \min(M_{ep}, M_{bo}, M_{pz}, M_c, M_b) \quad (23)$$

A calculation method of moment-rotation curve for steel beam to concrete-filled steel tube column connections with bidirectional bolts, the relation of moment M and rotation θ is established using the ultimate moment resistance $M_u$ obtained from equation (23):

$$M = M_u(1 - e^{-s_j\theta/M_u}) \quad (24)$$

where $S_j$ is the initial rotational stiffness of the connection, which can be obtained by experiment, simulation or analytical model; the calculation method of moment-rotation curve is applicable to four common types of connections: the extended unstiffened endplate bidirectional bolted connection, the extended stiffened endplate bidirectional bolted connection, the flush endplate bidirectional bolted connection, and the bidirectional bolted T-stub connection.

The beneficial effects of the invention are as follows: Based on the proposed calculation method of the initial rotation stiffness for steel beam to concrete-filled steel tube column connections with bidirectional bolts in previous study of the inventors, the ultimate moment resistance and moment-rotation curve of the connection can be obtained simply and quickly with only detailed dimensions and material properties of the connection and without experimental data, and thus lots of experiments for determination of semi-rigid design parameters of the connection are avoided, which greatly saves the costs of manpower, material resources, financial resources, time, etc. The present invention provides key parameters for semi-rigid design of the frame with steel beam to concrete-filled steel tube column connections with bidirectional bolts, and provides theoretical basis for the application of the connection in practical engineering.

DETAILED DESCRIPTION

In order to make the above features of the invention more understandable, the calculation method of the invention is described in detail below with the drawings and the exemplary embodiment.

Figure 1:
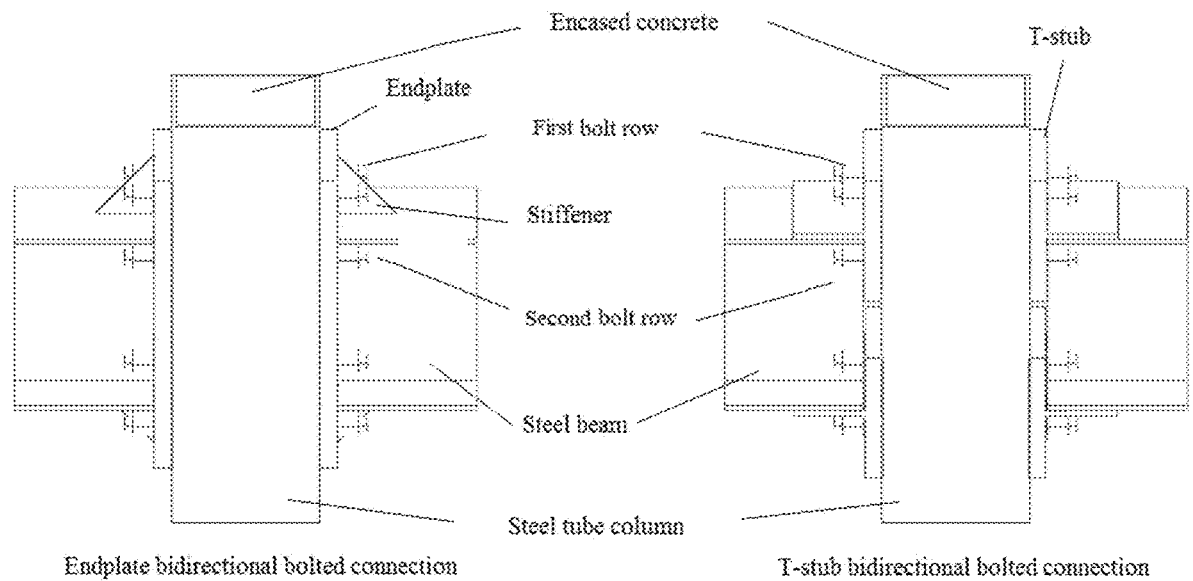
FIG. 1 is the three-dimensional schematic diagram for two of the four connection types, for which the present invention is applicable.
Figure 2:
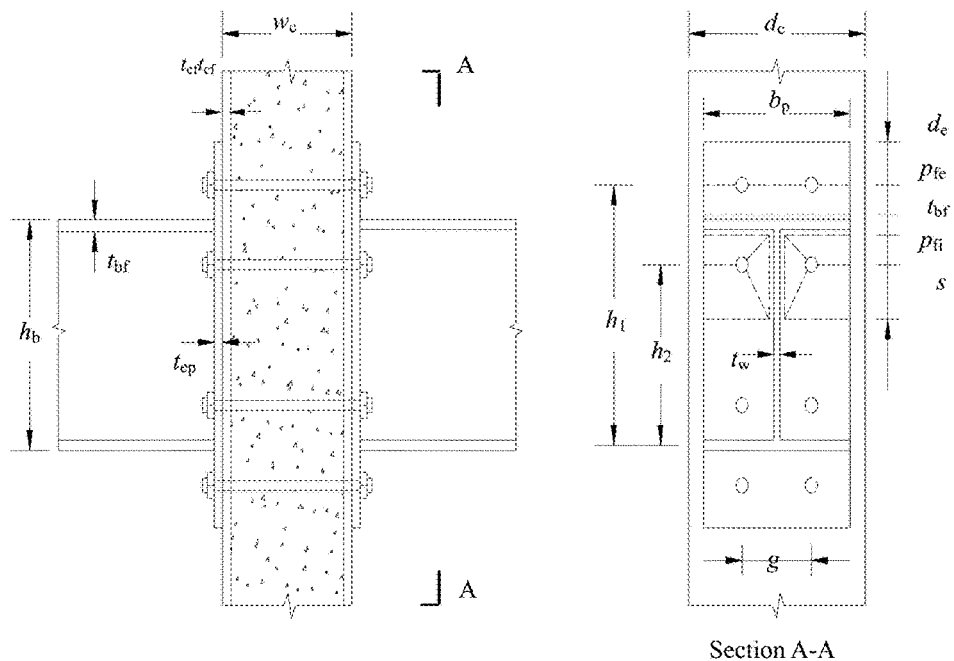
FIG. 2 is the schematic diagram of the extended unstiffened endplate bidirectional bolted connection, for which the present invention is applicable.
Figure 3:
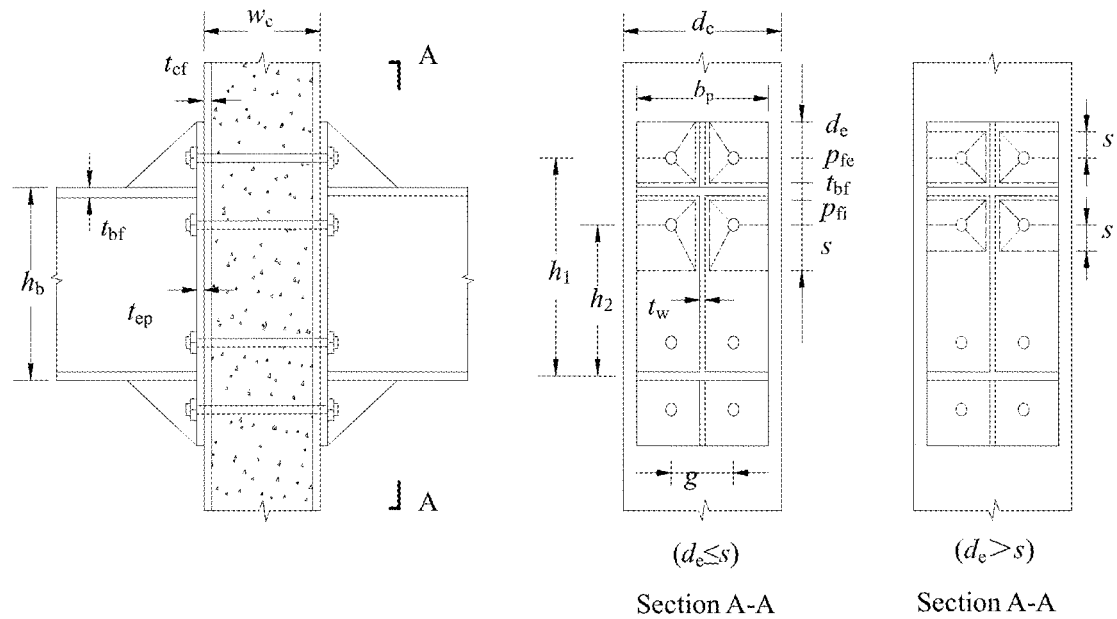
FIG. 3 is the schematic diagram of the extended stiffened endplate bidirectional bolted connection, for which the present invention is applicable.
Figure 4:
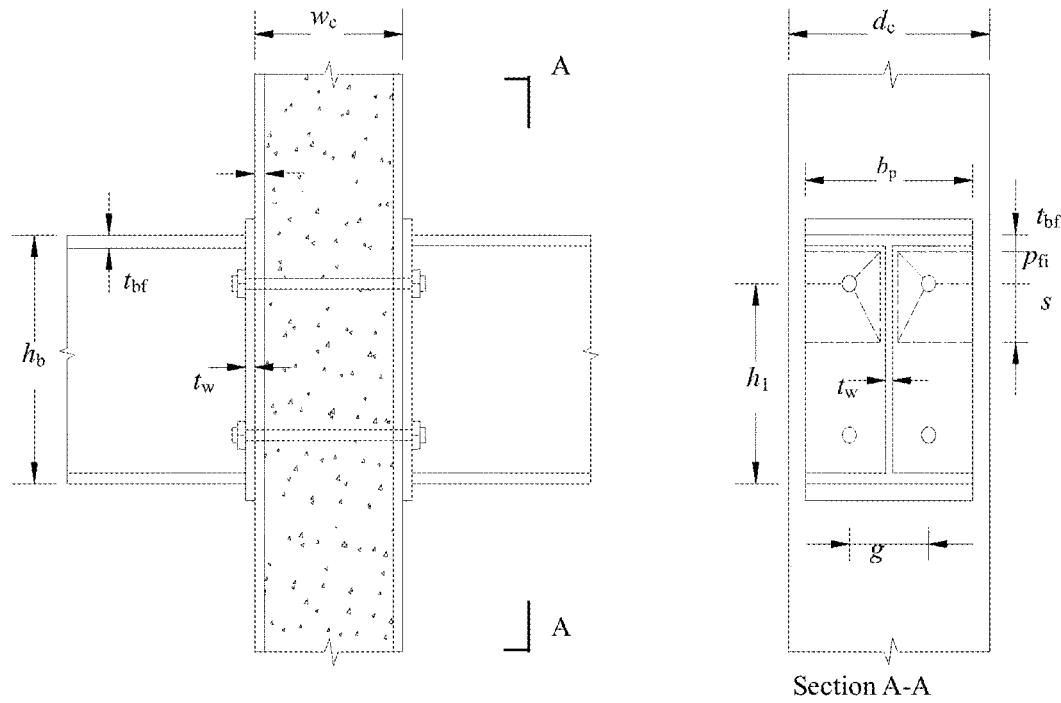
FIG. 4 is the schematic diagram of the flush endplate bidirectional bolted connection with only one row of bolts in the tensile zone, for which the present invention is applicable.
Figure 5:
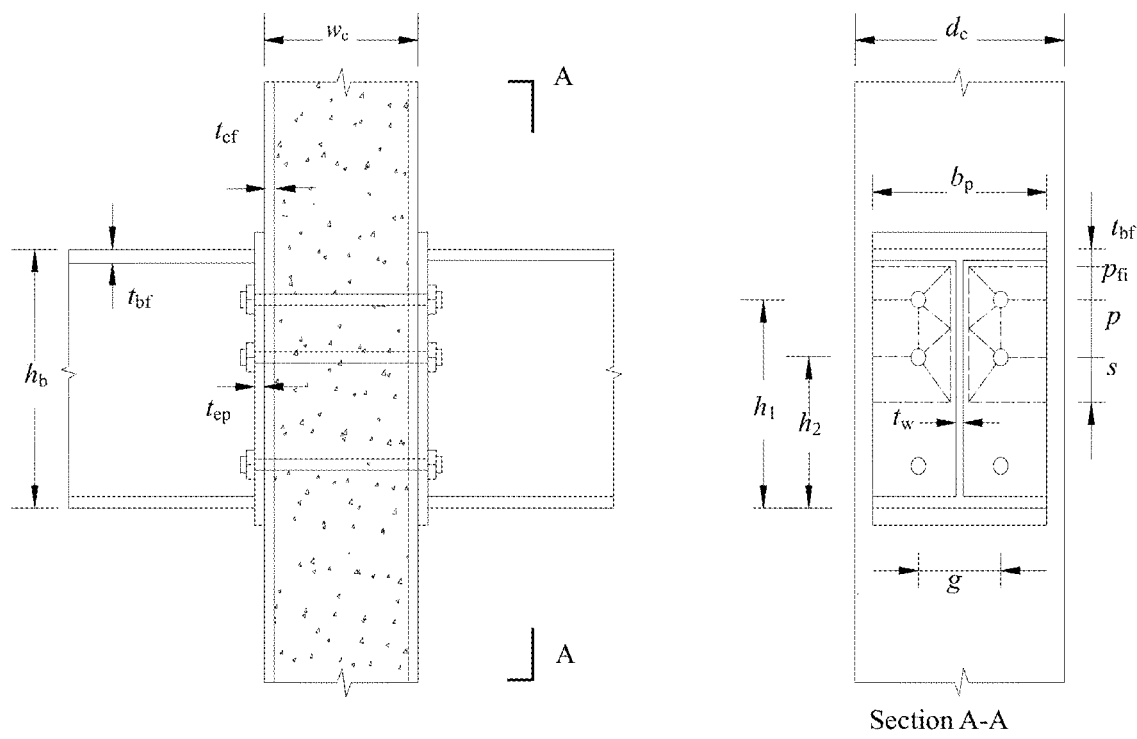
FIG. 5 is the schematic diagram of the flush endplate bidirectional bolted connection with two rows of bolts in the tensile zone, for which the present invention is applicable.
Figure 6:
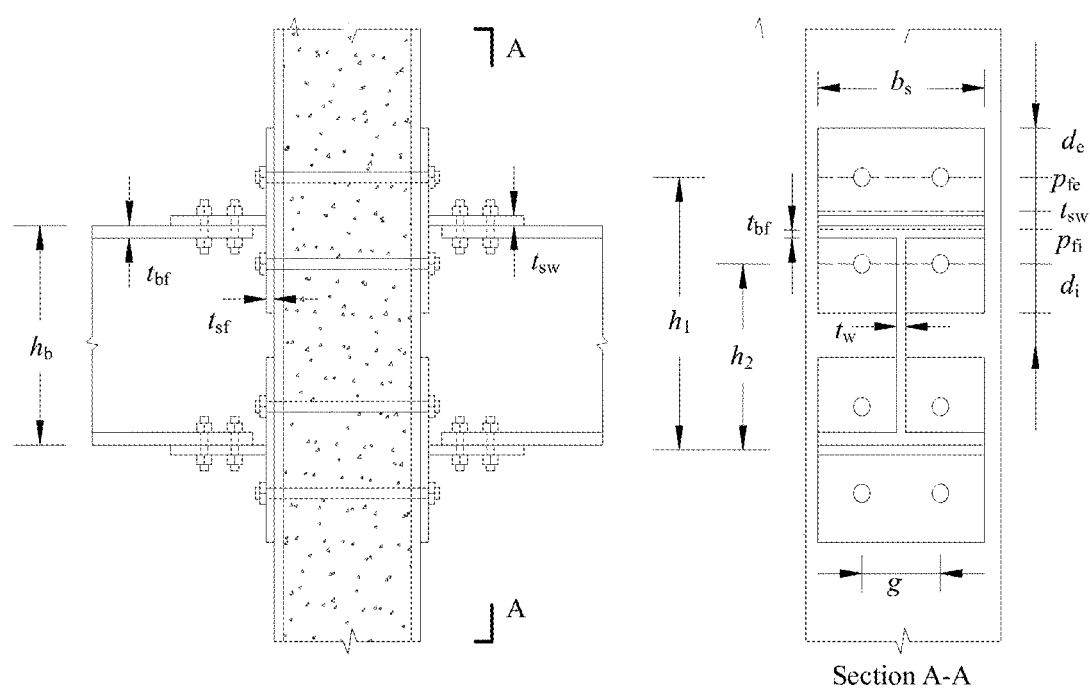
FIG. 6 is a schematic diagram of the bidirectional bolted T-stub connection, for which the present invention is applicable.
Figure 7:
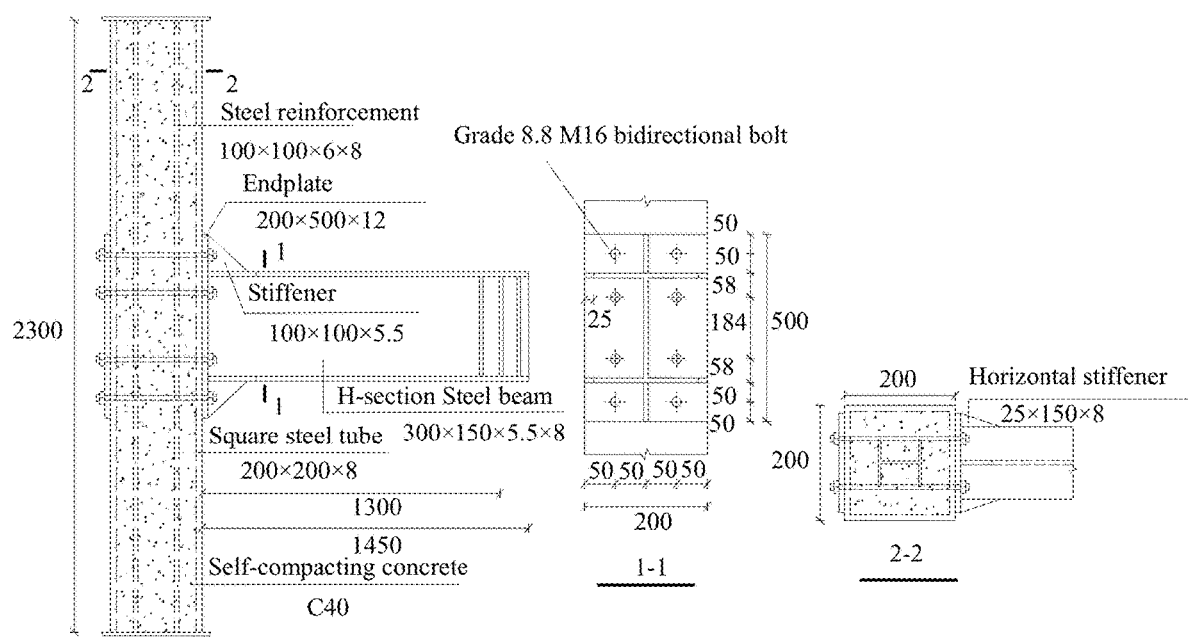
FIG. 7 is a detailed drawing of the extended stiffened endplate bidirectional bolted connection.

FIG. 1 shows the three-dimensional schematic diagram for two of the four connection types for which the present invention is applicable. FIGS. 2 to 6 are schematic diagrams for four types of connections, in which the physical meanings of symbols in formulas for yield line parameters of such connections are indicated. FIG. 7 is a detailed drawing of the present exemplary embodiment for the extended stiffened endplate bidirectional bolted connection, and its relevant parameters shown in Table 1 can be obtained from an existing reference:

TABLE 1

Relevant parameters of the connection

| $f_{yb}$ (Mpa) | $f_{y,cw}$ (Mpa) | $f_y$ (Mpa) | $f_{up}$ (Mpa) | $f_{ub}$ (Mpa) | $h_e$ (mm) | Axial compression ratio |
|---|---|---|---|---|---|---|
| 379.3 | 311.8 | 273.6 | 406.0 | 892 | 5.66 | 0.4 |

The calculation method of ultimate moment resistance and moment-rotation curve for the present exemplary embodiment is conducted according to the following steps:

1) Calculate the ultimate moment resistance of the connection for yielding of the endplate in bending:

The connection type of the exemplary embodiment is the extended stiffened endplate bidirectional bolted connection, so its yield line parameter can be obtained by Eq. (2):

$$L_2 = \frac{b_p}{2}\left[h_2\left(\frac{1}{p_{fi}} + \frac{1}{s}\right) + h_1\left(\frac{1}{p_{fe}} + \frac{1}{2s}\right)\right] + \frac{2}{g}[h_2(p_{fi} + s) + h_1(d_e + p_{fe})] = 3015.8$$

The ultimate moment resistance of the connection for yielding of the endplate in bending, i.e. $M_{ep}$, can be obtained by Eq. (7):

$$M_{ep} = f_y t_{ep}^2 L = 118.82 \text{ kN·m}$$

2) The ultimate moment resistance of the connection for failure of bidirectional bolts in tension can be calculated by Eq. (8):

$$M_{bo} = n_t \cdot \min(0.9 f_{ub} A_s, 0.48\pi d_m t_{ep} f_{up}) \cdot (h_b - t_{bf}) = 146.9 \text{ kN·m}$$

3) Calculate the ultimate moment resistance of the connection for failure of panel zone in shear:

The reduction factor to allow for the effect of longitudinal compression of the concrete-filled steel tube column on resistance in shear, i.e. $v$, can be calculated by Eq. (12):

$$v = 0.55\left(1 + \frac{2N}{N_u}\right) = 0.99$$

The angle $\alpha$ in the panel zone can be calculated by Eq. (13):

$$\alpha = \arctan[(w_c - 2t_{cf})/z] = 33.02°$$

The ultimate moment resistance of the connection for failure of panel zone in shear, i.e. $M_{pz}$, can be calculated by Eq. (10):

$$M_{pz} = \left(\frac{1.8 f_{y,cw} A_{vc}}{\sqrt{3}} + 0.85 v A_c f_{cd} \sin\alpha\right) \cdot (h_b - t_{bf}) = 385.17 \text{ KN·m}$$

4) Calculate the ultimate moment resistance of the connection for failure of column in transverse compression:

The reduction factor to allow for the effects of panel zone in shear on the transverse compression resistance of the steel tube web of the concrete-filled steel tube column, i.e. $\omega$, is calculated by Eq. (16):

$$\omega = \frac{1}{\sqrt{1 + 1.3(b_{eff,cw} t_{cw}/A_{vc})^2}} = 0.98$$

The reduction factor to allow for the concrete-filled steel tube column web buckling, i.e. $\rho$, is calculated by Eq. (17) and Eq. (18):

$$\lambda = 0.932\sqrt{\frac{b_{eff,cw}(w_c - 2t_{cf} - 2t) f_{y,cw}}{E t_{cw}^2}} = 0.87$$

$$\rho = (\lambda - 0.2)/\lambda^2 = 0.89$$

The factors to allow for the effect of longitudinal compressive stress on the transverse compression resistance of the steel tube and the encased concrete, i.e. $k_{cw}$ and $k_c$, are calculated by Eq. (19) and Eq. (20):

$$k_{cw} = 1$$

$$k_c = 2$$

The effective lengths of steel tube web and encased concrete in compression, i.e. $b_{eff,cw}$ and $b_{eff,c}$, can be calculated by Eq. (21):

$$b_{eff,cw} = b_{eff,c} = t_{bf} + 2\sqrt{2}h_e + 5(t_{cf} + t) + s_p = 72.84 \text{ mm}$$

The ultimate moment resistance of the connection for failure of column in transverse compression, i.e. $M_c$, can be calculated by Eq. (14):

$$M_c = [2\omega\rho k_{cw} b_{eff,cw} t_{cw} f_{y,cw} + 0.85 k_c b_{eff,c}(d_c - 2t_{cw}) f_{cd}] \cdot (h_b - t_{bf}) = 336.11 \text{ kN·m}$$

5) The ultimate moment resistance of the connection for yielding of the steel beam in bending can be calculated by Eq. (22):

$$M_b = f_{yb} W_p = 194.97 \text{ kN·m}$$

6) The final ultimate moment resistance and failure mode of connection can be calculated by Eq. (23):

$$M_u = \min\{M_{ep}; M_{bo}; M_{pz}; M_c; M_b\} = 118.82 \text{ kN·m}$$

The actual failure mode of the connection is the failure mode when the ultimate moment resistance equals to 118.82 kN·m in step 1), i.e. yielding of the endplate.

7) Calculate the moment-rotation curve of the connection:

According to an existing reference, the initial rotational stiffness of the connection is 33405 kN·m/rad, and then the moment-rotation curve can be obtained by substituting the ultimate moment resistance and initial rotational stiffness into Eq. (24):

$$M = 118.82 \cdot (1 - e^{-281.14\theta})$$

Figure 8:
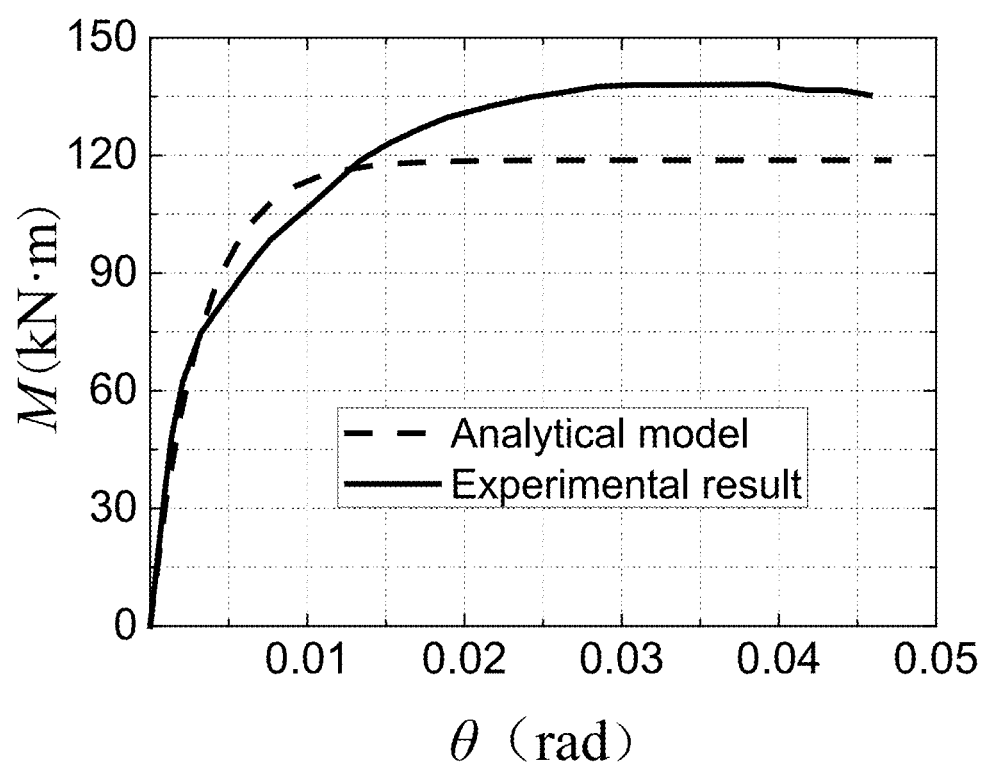
FIG. 8 is the moment-rotation curve of the extended stiffened endplate bidirectional bolted connection.

FIG. 8 is a comparison of moment-rotation curves for the exemplary embodiment between results based on the calculation method in this invention and experiments in the existing reference; it can be seen that the calculation method

The invention claimed is:

1. A calculation method of ultimate moment resistance for steel beam to concrete-filled steel tube column connections with bidirectional bolts, wherein the calculation method is applicable to an extended unstiffened endplate bidirectional bolted connection, an extended stiffened endplate bidirectional bolted connection, a flush endplate bidirectional bolted connection, and a bidirectional bolted T-stub connection; the calculation method comprising steps of:

1) calculating the ultimate moment resistance of all of the connections for yielding of all of the endplates or T-stub in bending, wherein firstly, yield line parameters for four common types of connections are calculated as follows:

for the extended unstiffened endplate bidirectional bolted connection, yield line parameter $L_1$ is obtained by equation (1):

$$L_1 = \frac{b_p}{2}\left[h_2\left(\frac{1}{p_{fi}}+\frac{1}{s}\right)+h_1\left(\frac{1}{p_{fe}}\right)-\frac{1}{2}\right]+\frac{2}{g}[h_2(p_{fi}+s)] \quad (1)$$

where $b_p$ is a width of the endplate; $h_1$ is a distance from centerline of first bolt row to lower surface of compression flange; $h_2$ is a distance from centerline of second bolt row to lower surface of the compression flange; $p_{fi}$ is a distance from centerline of the second bolt row to lower surface of tension flange; $p_{fe}$ is a distance from centerline of the first bolt row to upper surface of tension flange; g is bolt gage; $s=0.5\sqrt{b_p g}$ is a distance from centerline of second bolt row to edge of the yield line pattern;

for the extended stiffened endplate bidirectional bolted connection, if $d_e \leq s$, yield line parameter $L_2$ is obtained by equation (2):

$$L_2 = \frac{b_p}{2}\left[h_2\left(\frac{1}{p_{fi}}+\frac{1}{s}\right)+h_1\left(\frac{1}{p_{fe}}+\frac{1}{2s}\right)\right]+\frac{2}{g}[h_2(p_{fi}+s)+h_1(d_e+P_{fe})] \quad (2)$$

where $d_e$ is a distance from the centerline of the first bolt row to the edge of the endplate;

if $d_e > s$, the yield line parameter $L_2$ is obtained by equation (3):

$$L_2 = \frac{b_p}{2}\left[h_2\left(\frac{1}{p_{fi}}+\frac{1}{s}\right)+h_1\left(\frac{1}{p_{fe}}+\frac{1}{2s}\right)\right]+\frac{2}{g}[h_2(p_{fi}+s)+h_1(s+P_{fe})] \quad (3)$$

for the flush endplate bidirectional bolted connection, if there is only one row of bolts in tensile zone, the yield line parameter $L_3$ is obtained by equation (4):

$$L_3 = \frac{b_p h_1}{2}\left(\frac{1}{p_{fi}}+\frac{1}{s}\right)+\frac{2h_1}{g}(p_{fi}+s) \quad (4)$$

if there are two rows of bolts in the tensile zone, the yield line parameter $L_3$ is obtained by equation (5):

$$L_3 = \frac{b_p}{2}\left[h_1\left(\frac{1}{p_{fi}}\right)+h_2\left(\frac{1}{s}\right)\right]+\frac{2}{g}[h_1(p_{fi}+0.75p)+h_2(s+0.25p)]+\frac{g}{2} \quad (5)$$

where p is a distance between the two rows of bolts;

for the bidirectional bolted T-stub connection, yield line parameter $L_4$ is obtained by equation (6):

$$L_4 = \frac{b_s}{2}\left[h_2\left(\frac{1}{p_{fi}}\right)+h_1\left(\frac{1}{p_{fe}}\right)\right] \quad (6)$$

where $b_s$ is a width of the T-stub flange;

then, substituting the above yield line parameter L into equation (7), the ultimate moment resistance $M_{ep}$ of all of the connections for yielding of the endplate or T-stub in bending is obtained:

$$M_{ep} = f_y t_{ep}^2 L \quad (7)$$

where $f_y$ is yield strength of the endplate, $t_{ep}$ is the thickness of the endplate or T-shaped flange, and L is the yield line parameter of the connection, i.e. $L_1$, $L_2$, $L_3$ or $L_4$;

2) calculating the ultimate moment resistance of the connection for failure of bidirectional bolts in tension, wherein for endplate bidirectional bolted connections, the ultimate moment resistance of the connection for failure of bidirectional bolts in tension $M_{bo1}$ is obtained by equation (8):

$$M_{bo1} = n_t \cdot \min(0.9 f_{ub} A_s, 0.48\pi d_m t_{ep} f_{up}) \cdot (h_b - t_{bf}) \quad (8)$$

for the bidirectional bolted T-stub connection, the ultimate moment resistance of the connection for failure of bidirectional bolts in tension Mbo2 is obtained by equation (9):

$$M_{bo2} = n_t \cdot \min(0.9 f_{ub} A_s, 0.48\pi d_m t_{ep} f_{up}) \cdot (h_b + t_{bf}) \quad (9)$$

where $n_t$ is the number of bolts in tension zone; $f_{ub}$ is the ultimate tensile strength of the bolt, $A_S$ is the effective tensile area of the bolt, $d_m$ is a nominal diameter of the bolt head, $h_b$ is the height of the steel beam, $t_{bf}$ is the thickness of beam flange, and $f_{up}$ is the ultimate tensile strength of the endplate or T-stub flange;

3) calculating the ultimate moment resistance of the connection for failure of the panel zone in shear, wherein for endplate bidirectional bolted connections, the ultimate moment resistance of the connection for failure of the panel zone in shear $M_{pz1}$ is obtained by equation (10):

$$M_{pz1} = \left(\frac{1.8 f_{y,cw} A_{vc}}{\sqrt{3}}+0.85 v A_c f_{cd} \sin\alpha\right) \cdot (h_b - t_{bf}) \quad (10)$$

for the bidirectional bolted T-stub connection, the ultimate moment resistance of the connection for failure of a panel zone in shear $M_{pz2}$ is obtained by equation (11):

$$M_{pz2} = \left(\frac{18 f_{y,cw} A_{vc}}{\sqrt{3}}+0.85 v A_c f_{cd} \sin\alpha\right) \cdot (h_b + t_{bf}) \quad (11)$$

where $f_{y,cw}$ is yield strength of a steel tube web of the concrete-filled steel tube column; $A_{vc}$ is the cross-sectional area of the steel tube web in shear; v is a reduction factor to allow for the effect of longitudinal compression of steel tube in the concrete-filled steel tube column on resistance in shear; $A_c$ is the cross-sectional area of the encased concrete; $f_{cd}$ is a design value of the cylindrical compressive strength of an encased concrete of the concrete-filled steel tube column; α is an angle in a panel zone;

the reduction factor to allow for the effect of longitudinal compression of the concrete-filled steel tube column on resistance in shear, i.e. v, is calculated according to equation (12):

$$v = 0.55\left(1 + \frac{2N}{N_u}\right) \quad (12)$$

where N is a design compressive normal force in the concrete-filled steel tube column, and $N_u$ is an ultimate compressive bearing capacity of the concrete-filled steel tube column;

the angle α in the panel zone is calculated according to equation (13):

$$\alpha = \arctan[(w_c - 2t_{cf})/z] \quad (13)$$

where $w_c$ is a width of the concrete-filled steel tube column; $t_{cf}$ is the thickness of the steel tube flange of the concrete-filled steel tube column; z is a length of the lever arm for the connection, and z is ($h_b - t_{bf}$) for endplate bidirectional bolted connections, while z is ($h_b + t_{bf}$) for the bidirectional bolted T-stub connection;

4) calculating the ultimate moment resistance of the connection for failure of column in transverse compression, wherein for endplate bidirectional bolted connections, the ultimate moment resistance of the connection for failure of column in transverse compression Mc1 is obtained by equation (14):

$$M_{c1} = [2\omega\rho k_{cw} b_{eff,cw} t_{cw} f_{y,cw} + 0.85 k_c b_{eff,c}(d_c - 2t_{cw}) f_{cd}] \cdot (h_b - t_{bf}) \quad (14)$$

for the bidirectional bolted T-stub connection, the ultimate moment resistance of the connection for failure of column in transverse compression $M_{c2}$ is obtained by equation (15):

$$M_{c2} = [2\omega\rho k_{cw} b_{eff,cw} t_{cw} f_{y,cw} + 0.85 k_c b_{eff,c}(d_c - 2t_{cw}) f_{cd}] \cdot (h_b + t_{bf}) \quad (15)$$

where ω is the reduction factor to allow for the effects of panel zone in shear on a transverse compression resistance of the steel tube web of the concrete-filled steel tube column; ρ is the reduction factor to allow for the steel tube web buckling in the concrete-filled steel tube column; $k_{cw}$ and $k_c$ are two factors to allow for the effect of longitudinal compressive stress on the transverse compression resistance of the steel tube and the encased concrete, respectively; $b_{eff,cw}$ and $b_{eff,c}$ are effective lengths of steel tube web and encased concrete in compression respectively; $d_c$ is section depth of the concrete-filled steel tube column; $t_{cw}$ is the thickness of the steel tube web;

the reduction factor to allow for the effects of panel zone in shear on the transverse compression resistance of the steel tube web of the concrete-filled steel tube column, i.e. ω, is obtained by equation (16):

$$\omega = \begin{cases} \dfrac{1}{\sqrt{1 + 1.3(b_{eff,cw} t_{cw}/A_{vc})^2}} & \text{(for exterior connections)} \\ 1 & \text{(for interior connections)} \end{cases} \quad (16)$$

the reduction factor to allow for the steel tube web buckling in the concrete-filled steel tube column ρ, is obtained by equations (17):

$$\rho = \begin{cases} (\lambda - 0.2)/\lambda^2 & (\lambda > 0.72) \\ 1 & (\lambda \leq 0.72) \end{cases} \quad (17)$$

$$\lambda = 0.932\sqrt{\frac{b_{eff,cw}(w_c - 2t_{cf} - 2t)f_{y,cw}}{Et_{cw}^2}} \quad (18)$$

where λ is slenderness ratio of the steel tube web in the concrete-filled steel tube column; for rolled section of the steel tube, t is the inner radius of corners in the steel tube with rolled section; for welded section of the steel tube, t is the height of the steel tube weld leg; E is elastic modulus of the steel tube;

the factors to allow for effect of longitudinal compressive stress on the transverse compression resistance of the steel tube and encased concrete or $k_{cw}$ and $k_c$, are obtained by equations (19) and (20):

$$k_{cw} = \begin{cases} 1 & (\sigma_{col} \leq 0.7 f_{y,cw}) \\ 1.7 - \dfrac{\sigma_{col}}{f_{y,cw}} & (\sigma_{col} > 0.7 f_{y,cw}) \end{cases} \quad (19)$$

$$k_c = 1.3 + 3.3\frac{\sigma_c}{f_{cd}}, \text{ and } k_c = 2 \text{ if it is greater than 2} \quad (20)$$

where $\sigma_{col}$ is the longitudinal compressive stress in the steel tube of the concrete-filled steel tube column, $\sigma_c$ is longitudinal compressive stress in encased concrete;

the effective lengths of steel tube web and encased concrete in compression $b_{eff,cw}$ and $b_{eff,c}$, are obtained by equation (21):

$$b_{eff,cw} = b_{eff,c} = t_{bf} + 2\sqrt{2}h_e + 5(t_{cf} + t) + s_p \quad (21)$$

where $h_e$ is an effective height of a weld seam between a steel beam flange and the endplate; $s_p$ is length obtained by dispersion through the endplate, and its minimum is the thickness of the endplate, and its maximum is double thickness of the endplate;

5) calculating the ultimate moment resistance of the connection for yielding of the steel beam in bending, wherein the ultimate moment resistance of the connection for yielding of the steel beam in bending $M_b$ is obtained by equation (22):

$$M_b = f_{yb} W_p \quad (22)$$

where $f_{yb}$ is yield strength of the steel beam; $W_p$ is a plastic section modulus of the steel beam;

6) calculating the final ultimate moment resistance and failure mode of the connection, wherein the smallest value of ultimate moment resistances for the above five failure modes is the final ultimate moment resistance of the connection, and the corresponding failure mode is an actual failure mode; for endplate bidirectional bolted connections, the ultimate moment resistance $M_{u1}$ can be obtained:

$$M_{u1}=\min(M_{ep},M_{bo1},M_{pz1},M_{c1},M_b) \tag{23}$$

for the bidirectional bolted T-stub connections, the ultimate moment resistance $M_{u2}$ can be obtained:

$$M_{u2}=\min(M_{ep},M_{bo2},M_{pz2},M_{c2},M_b). \tag{24}$$

2. The calculation method of ultimate moment resistance for steel beam to concrete-filled steel tube column connections with bidirectional bolts according to claim 1, for endplate bidirectional bolted connections, the relation between moment $M_1$ and rotation $\theta_1$ can be obtained by equation (25):

$$M_1=M_{u1}(1-e^{-s_j\theta_1/M_{u1}}) \tag{25}$$

for bidirectional bolted T-stub connections, the relation between moment $M_2$ and rotation $\theta_2$ can be obtained by equation (26):

$$M_2=M_{u2}(1-e^{-s_j\theta_2/M_{u2}}) \tag{26}$$

where $S_j$ is initial rotational stiffness of the connection, which can be obtained by experiment, simulation or analytical model; the calculation method of moment-rotation curve is applicable to four common types of connections: the extended unstiffened endplate bidirectional bolted connection, the extended stiffened endplate bidirectional bolted connection, the flush endplate bidirectional bolted connection, and the bidirectional bolted T-stub connection.

\* \* \* \* \*